United States Patent [19]
Hart et al.

[11] Patent Number: 5,750,052
[45] Date of Patent: May 12, 1998

[54] FOAM CONTROL METHOD

[75] Inventors: Paul R. Hart; Michael A. Dion, both of The Woodlands, Tex.

[73] Assignee: BetzDearborn Inc., Trevose, Pa.

[21] Appl. No.: 697,851

[22] Filed: Aug. 30, 1996

[51] Int. Cl.$^6$ .......................... B01D 19/04; C01G 49/22
[52] U.S. Cl. ............... 252/321; 252/358; 208/48 AA; 208/100; 208/184; 203/20; 201/9
[58] Field of Search ........................ 252/321, 358; 203/20; 201/9; 208/184, 100, 48 AA

[56] References Cited

U.S. PATENT DOCUMENTS

| | | | |
|---|---|---|---|
| 3,722,184 | 3/1973 | McMinn | 208/184 |
| 4,711,735 | 12/1987 | Gulley | 252/75 |
| 4,717,495 | 1/1988 | Hercamp et al. | 252/75 |
| 5,008,035 | 4/1991 | Broom | 252/312 |
| 5,169,560 | 12/1992 | Hart | 252/321 |
| 5,256,305 | 10/1993 | Hart | 210/708 |
| 5,296,132 | 3/1994 | Hart | 208/131 |
| 5,389,299 | 2/1995 | Hart | 252/321 |
| 5,472,637 | 12/1995 | Hart | 252/358 |

*Primary Examiner*—Richard D. Lovering
*Assistant Examiner*—Daniel S. Metzmaier
*Attorney, Agent, or Firm*—Alexander D. Ricci; Matthew W. Smith

[57] ABSTRACT

Methods for controlling foam in hydrocarbon liquids within hydrocracking unit separator systems utilizing alkylphenol-formaldehyde resin alkoxylates with a propylene oxide/ethylene oxide block copolymer having a molecular weight of from about 2000 to 6000 and having from about 20% to about 80% ethoxylation or an alkylarylsulfonic acid or alkylarylsulfonic acid amine salt to said hydrocarbon liquid.

6 Claims, No Drawings

FOAM CONTROL METHOD

FIELD OF THE INVENTION

The present invention pertains to methods for controlling foaming in hydrocarbons in hydrocracking unit separator systems.

BACKGROUND OF THE INVENTION

Petroleum refining involves the fractional distillation of crude oils into naphthas, low octane gasoline, kerosene, fuel oil, asphaltic residues and the thermal and catalytic cracking of gas oils. Gas oils are liquid petroleum distillates with viscosity and boiling ranges between those of kerosene and lubricating oil.

Catalytic cracking units called "hydrocracking units" use hydrogen to cleave (crack) hydrocarbon species in gas oil into hydrocarbons useful in producing high octane gasoline.

After cracking, the hydrocarbon is passed through one or more separators to remove gaseous materials from the hydrocarbon liquid. Process conditions in the separator system are typically 180° F. at 1900 psi in the first stage separator and 160° F. at 1900 psi in the second stage separator.

Foam is often generated as the liquid hydrocarbon is degassed in the separators. Known foam control agents for hydrocarbons such as silicone have met with limited success at inhibiting foam formation in hydrocracking unit separators, thus it is an object of this invention to provide a method of controlling foam in hydrocracking unit separators.

SUMMARY OF THE INVENTION

The present invention relates to methods for controlling foaming in hydrocarbon liquids in hydrocarbon separator systems comprising adding an alkylphenolformaldehyde resin alkoxylate, a non-metallic alkylarylsulfonate or a blend thereof to said hydrocarbon fluid. The alkylphenolformaldehyde resin alkoxylate is preferably used in combination with propylene oxide/ethylene oxide copolymers.

DESCRIPTION OF RELATED ART

U.S. Pat. No. 5,169,560 discloses a method and a composition for foam control in non-aqueous systems utilizing sulfonate or phosphonate compounds with finely divided carbon.

U.S. Pat. No. 5,296,132 discloses methods and compositions for controlling foam in high temperature hydrocarbons during hydrocarbon processing comprising adding vegetable oils to the hydrocarbon.

U.S. Pat. No. 5,389,299 discloses methods and compositions for controlling foam in high temperature hydrocarbons during processing. The method comprises adding a foam inhibiting amount of a mammal scent gland oil to the hydrocarbon.

U.S. Pat. No. 5,472,637 discloses a method and composition for foam control in non-aqueous systems utilizing polyisobutylene compounds.

DESCRIPTION OF THE INVENTION

The present invention relates to a method for inhibiting foam formation in hydrocarbon liquids within a petroleum hydrocarbon unit gas-liquid separator. The method comprises adding an effective amount of an alkylphenolformaldehyde resin alkoxylate, a non-metallic alkylarylsulfonate or a mixture thereof to the hydrocarbon fluid.

The alkylphenolformaldehyde resin alkoxylates are $C_3$ to $C_{24}$ phenol-formaldehyde resins having molecular weights of 500 to 10,000 and with about 20% to about 80% of $C_2$ to $C_4$ alkoxylation. Preferred resins are nonylphenol formaldehyde resin ethoxylates having an average of about 50% ethylene oxide and molecular weights of about 2500. Representative alkylphenolformaldehyde resin alkoxylates include Baker Performance Chemical Arbreak, Witco Corporation Witbreak, BASF Corporation Pluradyne®, Hoechst Aktiengesellschaft Dissolvan® and ICI Chemicals and Polymers Ltd. Kemelix® alkylphenolformaldehyde resin alkoxylates.

The non-metallic alkyarylsulfonates include the acids and the amine salts. Preferred alkylarylsulfonates are dodecybenzene sulfonic acid (DDBSA) and its amine salts, particularly DDBSA alkanolamine salts. Dodecylbenzene sulfonic acid is available commercially as Witconate 1298 soft acid (linear chain) and hard acid (branched chain) from Witco. Alkanolamines include the mono-, di- and tri- ethanolamines and their condensation products such as are available commercially from Huntman Chemical Company.

Ethoxylated alkyl phenols can also be used in combination with the alkylphenolformaldehyde resin alkoxylates of this invention. Representative alkylphenol ethoxylates include the Igepal CO-series of $C_8$ to $C_{18}$ alkylphenol ethoxylates available commercially from Rhône-Polenc.

The alkylphenolformaldehyde resins of the present invention can also be used in combination with propylene oxide/ethylene oxide block copolymers having molecular weights of from about 2000 to 6000 and having from about 20% to about 80% ethoxylation. Representative copolymers are available commercially from Baker Performance Chemicals, Witco Corporation, BASF, Hoechst Aktiengesellschaft and ICI.

The alkylphenolformaldehyde resin alkoxylate can be added to the hydrocarbon liquid experiencing foaming problems alone or in combination with propylene oxide/ethylene oxide block copolymers, alkylarylsulfonic acids or amine salts or alkylphenol ethoxylates. Preferably the alkylphenolformaldehyde resin alkoxylate is added to the hydrocarbon liquid in a blend with propylene oxide/ethylene oxide block copolymers, non-metallic sulfonates and/or alkylphenol ethoxylates in a suitable solvent such as an organic oil or naphtha.

The alkylarylsulfonate is preferably added as dodecylbenzene sulfonic acid alkanolamine salt in a suitable solvent such as an organic oil or naphtha.

The defoamers of this invention are preferably added directly into the first separator or in separate additions to each separator in the system in amounts necessary to inhibit foam formation. Specific dosages are determined by conditions existing in the particular hydrocarbon processing system. However, dosages of 15 parts per million (ppm) to 1500 ppm of alkylphenolformaldehyde resin ethoxylate or alkylarylsulfonic acids or amine salts in the hydrocarbon liquid are expected to effectively inhibit foam formation.

The defoamers of the present invention can be used to treat foaming problems along with other hydrocarbon treatment programs such as anti-foulants and corrosion inhibitors.

The invention will now be further described with reference to a number of specific examples which are to be regarded solely as illustrative and not restricting the scope of the present invention.

EXAMPLE I

A hydrocracker unit separator is connected by tubing to one of two ports in the top of a 200 mL graduated glass cylinder. The other port on the top of the graduated cylinder is connected to a 10 mL burret. The bottom of the graduate cylinder has a drain port connected to tubing. The tubing from the separator to the graduated cylinder and the tubing from the cylinder to the drain have needle valves to control liquid flow through the tubing so that a steady foam height results in the cylinder.

The buret is used to add 0.5 mL of a 20% dilution of a candidate defoamer to the top of the graduated cylinder to achieve approximately 150 parts defoamer active per million parts hydrocarbon in the graduated cylinder. The change in the foam height seen in the glass cylinder five seconds after adding the candidate defoamer is recorded.

The results are shown on the table below:

TABLE I

Defoamer Results

| Type | Active Ingredient | Δ Foam Height (mL) (from 220 mL average) |
|---|---|---|
| Resin | 35% $C_9$ phenol formaldehyde resin propoxylethoxylates (40% EO) | −30 |
| Resin-Block Copolymer | 24.5% $C_9$ phenol formaldehyde resin ethoxylate (50% EO) 10.5% triolpropylene oxide ethylene oxide block copolymers (40% EO) | −130 |
| Resin-Block Copolymer | 32% $C_9$ phenol formaldehyde resin ethoxylate (50% EO) 3% glycol propylene oxide ethylene oxide block copolymers (40% EO) | −30 |
| Resin-sulfonate-phenol-ethoxylate | 43% DDBSA (linear) 6% $C_9$ phenol formaldehyde resin ethoxylates (50% EO) 2.5% $C_9$ phenol ethoxylates (80% EO) | −30 |
| Sulfonate-alkanolamine | 37.5% DDBSA (linear) 25% ethanolamines (70% EO) | −140 |

Where EO is the average amount of ethoxylation.

TABLE II

Comparative Results

| Type | Active Ingredient | Δ Foam Height (mL) (from 220 mL average) |
|---|---|---|
| Silicon | 45% 600 St. dimethylsilicone | +20 |
| | 25% 1000 St. dimethylsilicone | 0 |
| Polyiso-butylene | 25% 2300 MW polyisobutylene | 0 |
| | 100% 320 MW polyisobutylene | 0 |
| Natural Oils | 100% jojoba oil | −10 |
| | 100% mink oil | 0 |
| Metallic Sulfonates | 25% petroleum based sodium sulfonate salts | 0 |
| | 100% caster oil based sodium sulfonate salts | 0 |
| Block Copolymers | 30% glycol propylene oxide ethylene oxide block copolymers | 0 |

TABLE II-continued

Comparative Results

| Type | Active Ingredient | Δ Foam Height (mL) (from 220 mL average) |
|---|---|---|
| | (40% EO) | |

The results shown in Tables I and II above demonstrate that alkylphenolformaldehyde resin alkoxylates and alkylaryl hydrogen or amine sulfonates are effective foam inhibitors of hydrocarbon liquids in hydrocracker separator systems. The results also show that alkylphenoformaldehyde resin alkoxylate/block copolymer blends and dodecybenzenesulfonic acid alkanolamine salts are particularly effective foam inhibitors for hydrocarbons in hydrocracker separator systems.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, we claim:

1. A method for controlling foam in a hydrocarbon liquid within a petroleum hydrocracker unit separator comprising adding a foam inhibiting amount of
   a) an alkylphenolformaldehyde resin alkoxylate; and
   b) a propylene oxide/ethylene oxide block copolymer having a molecular weight of from about 2000 to 6000 and having from about 20% to about 80% ethoxylation or an alkylarylsulfonic acid or alkylarylsulfonic acid amine salt to said hydrocarbon liquid.

2. The method of claim 1 wherein said alkylphenolformaldehyde resin alkoxylate has $C_3$ to $C_{24}$ alkyl moieties, has from about 20% to 80% $C_2$ to $C_4$ alkoxylation, and has a molecular weight of from about 500 to 10,000.

3. The method of claim 1 wherein said alkylphenolformaldehyde resin alkoxylate is added to said hydrocarbon liquid in an amount of from about 15 parts to 1500 parts of alkylphenolformaldehyde resin alkoxylate per million parts of said hydrocarbon liquid.

4. The method of claim 1 wherein said alkylarylsulfonic acid is dodecylbenzene sulfonic acid or said alkylarylsulfonic acid amine salt is dodecylbenzene sulfonic acid alkanolamine salt.

5. The method of claim 1 further comprising adding a $C_8$ to $C_{18}$ alkylphenol ethoxylate to said hydrocarbon liquid.

6. The method of claim 1 wherein said alkylarylsulfonic acid or alkylarylsulfonic acid amine salt is added to said hydrocarbon liquid in an amount of from about 15 parts to about 1500 parts of said alkylarylsulfonic acid or alkylarylsulfonic acid amine salt per million parts of said hydrocarbon liquid.

* * * * *